May 19, 1931.    A. W. FISHER ET AL    1,806,051
LIGHT SIGNAL
Original Filed June 29, 1927    3 Sheets-Sheet 1

INVENTORS:
A. W. Fisher, and
W. B. Wells,
by A. L. Verrill,
Their attorney

May 19, 1931.  A. W. FISHER ET AL  1,806,051

LIGHT SIGNAL

Original Filed June 29, 1927   3 Sheets-Sheet 2

INVENTORS:
A. W. Fisher, and
W. B. Wells,
by A. L. Verrill
Their Attorney

May 19, 1931.  A. W. FISHER ET AL  1,806,051
LIGHT SIGNAL
Original Filed June, 29, 1927    3 Sheets-Sheet 3
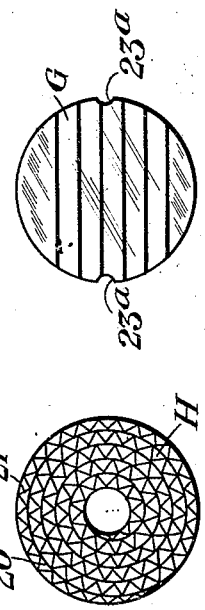
Fig.7.
Fig.6.
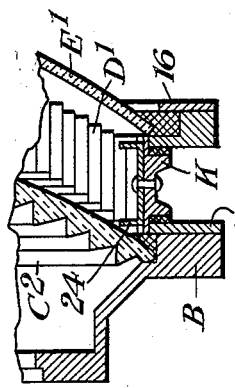
Fig.8.
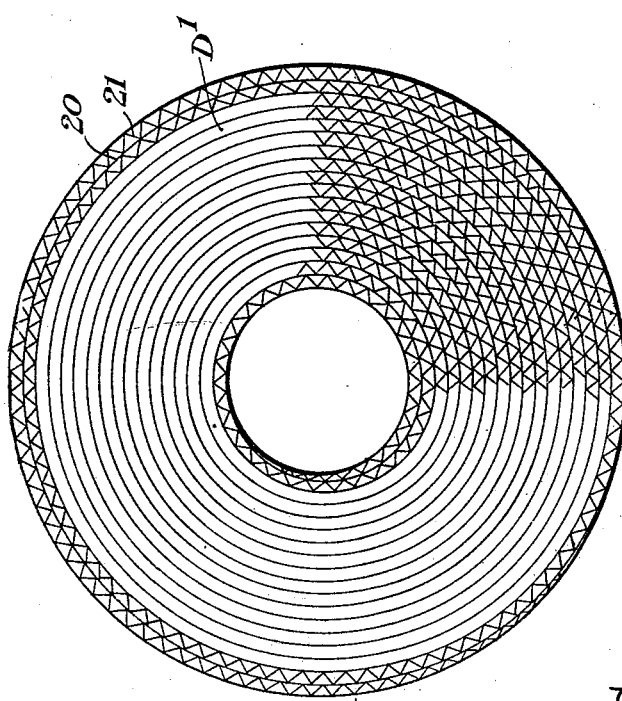
Fig.5.
INVENTORS:
A. W. Fisher, and
W. B. Wells,
by A. R. Vencill
Their Attorney.

Patented May 19, 1931

1,806,051

UNITED STATES PATENT OFFICE

ARTHUR W. FISHER, OF FOREST HILLS BOROUGH, AND WESLEY B. WELLS, OF WILKINS-BURG, PENNSYLVANIA, ASSIGNORS TO THE UNION SWITCH & SIGNAL COMPANY, OF SWISSVALE, PENNSYLVANIA, A CORPORATION OF PENNSYLVANIA

LIGHT SIGNAL

Application filed June 29, 1927, Serial No. 202,194. Renewed October 29, 1930.

Our invention relates to light signals, and particularly to signals of the type comprising a doublet made up of two echelon lenses for projecting a beam of parallel rays from a source of light.

The present application is a continuation of our co-pending application filed October 27, 1926, Serial No. 144,516, for light signals, in so far as the subject matter common to the two is concerned.

We will describe two forms of signals embodying our invention, and will then point out the novel features thereof in claim.

Figure 2:
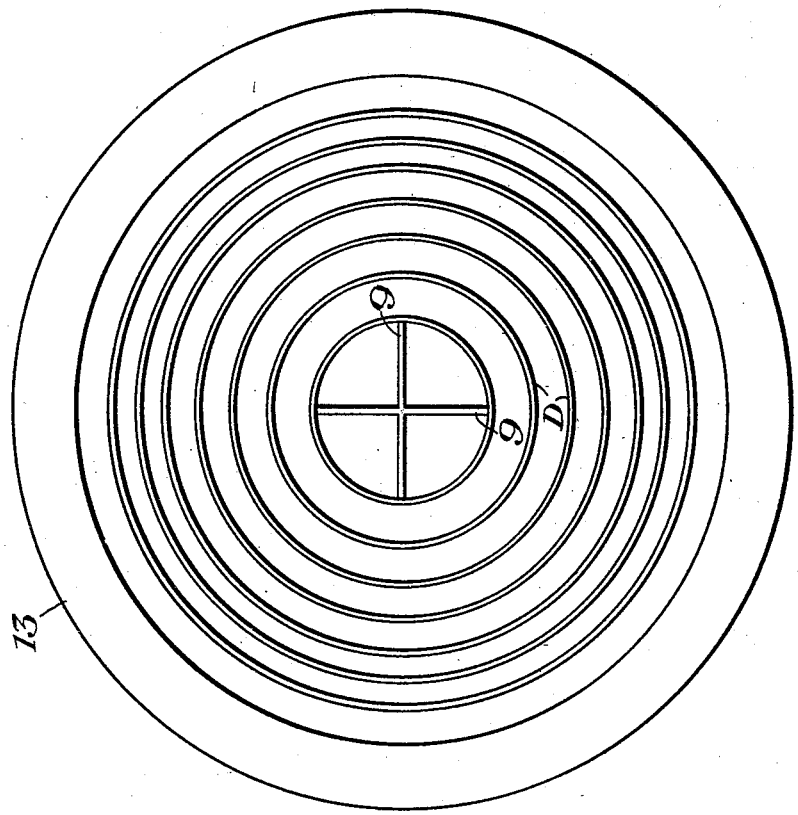
Figure 1:
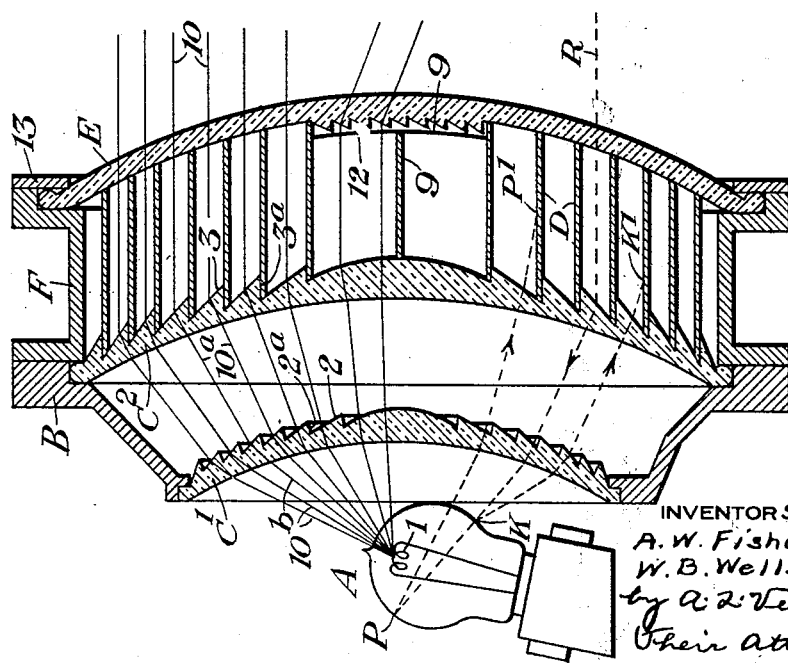
Figure 4:
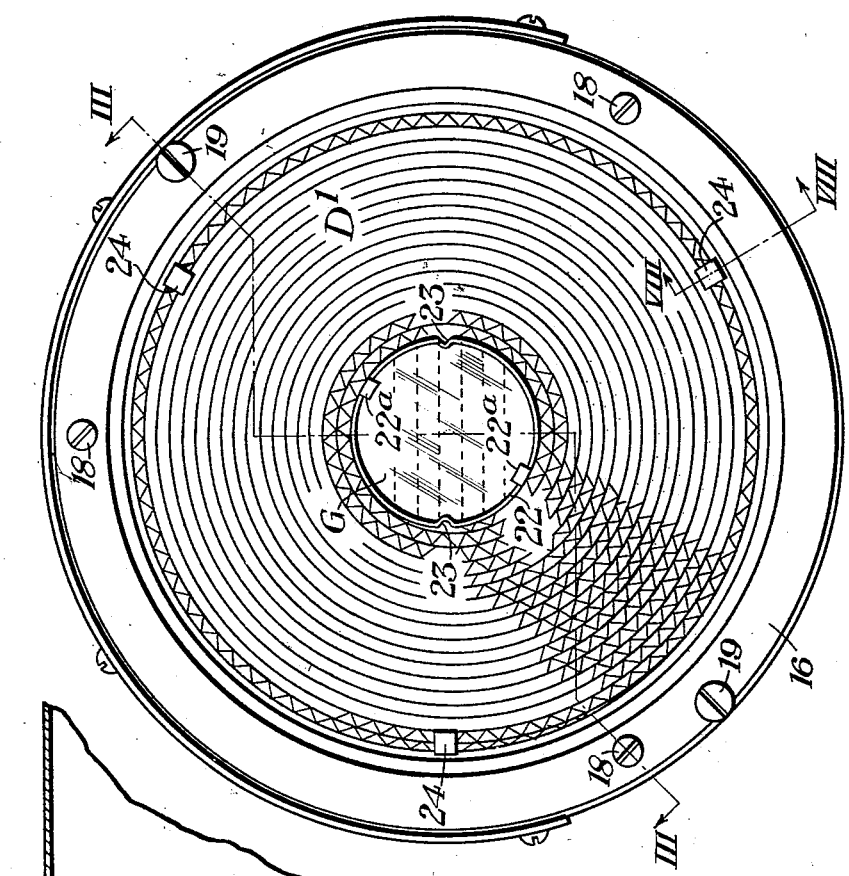
Figure 3:
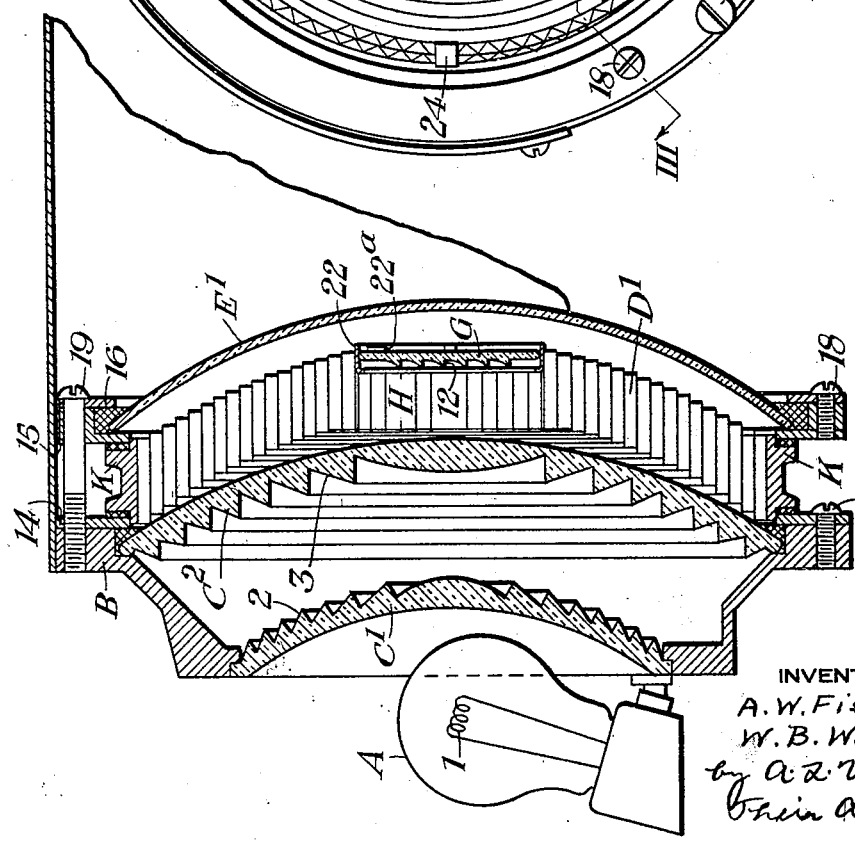

In the accompanying drawings, Fig. 1 is a view showing in vertical section one form of light signal embodying our invention. Fig. 2 is a front view of the signal shown in Fig. 1. Fig. 3 is a vertical sectional view showing a modified form of signal also embodying our invention, and is taken on the line III—III in Fig. 4. Fig. 4 is a front view of the signal shown in Fig. 3. Fig. 5 is a front view showing a screen structure $D^1$ forming part of the signal shown in Figs. 3 and 4, and Fig. 6 is a front view of an auxiliary screen structure H also forming part of the signal shown in Figs. 3 and 4. Fig. 7 is a rear view showing an auxiliary lens G forming part of the signal shown in Figs. 3 and 4. Fig. 8 is a fragmentary view showing means for assembling parts of the signal illustrated in Figs. 3 and 4.

Similar reference characters refer to similar parts in each of the several views.

Referring first to Figs. 1 and 2, the signal comprises a suitable frame or housing B supporting a source of light A, and a doublet made up of two echelon lenses $C^1$ and $C^2$. The source of light A is an incandescent lamp having a filament 1 located at the focal point of the doublet.

The lines $10^b$ indicate light rays emerging radially from the filament 1 of the lamp A and striking the inner lens $C^1$, from which they emerge in the directions indicated by the lines $10^a$. The rays $10^a$ strike the outer lens $C^2$ in paths which would, if extended backwardly, converge at the focal point of the lens $C^2$, so that the light rays emerge from lens $C^2$ in the directions indicated by the lines 10. The lines 10 are parallel so that the light projected from the signal is in the form of a beam of parallel rays.

The inner lens $C^1$ is of standard form and has on its outer surface a plurality of concentric wedge-shaped grooves 2, each having a surface $2^a$ which is parallel to the contiguous rays $10^a$. The outer lens $C^2$ is also provided with a plurality of wedge-shaped grooves 3 on its outer surface, each having a surface $3^a$ which is parallel to the axis of the lens combination and therefore is parallel with the light rays 10 emerging from these lenses.

The reference character E designates a cover glass located outside of, and spaced from, the outer lens $C^2$ of the doublet. As here shown, the cover glass E is supported by a cylindrical channel-shaped member F which is suitably attached to the frame or housing B. The cover glass is held in place against the member F by a ring 13. The bolts for attaching member F and ring 13 to the frame B are omitted from the drawing.

Between the outer lens $C^2$ and the cover glass E are located a plurality of concentric opaque cylindrical screens D, the function of which is to intercept light rays which enter the signal from the outside and to prevent these rays from being projected forward by the signal to give a phantom indication. As here shown each screen D extends from the bottom of one of the grooves 3 in the outer lens $C^2$ to the inner surface of the cover glass E. Inasmuch as the screens D are parallel with the light rays emerging from the lens $C^2$ these screens have substantially no effect upon the main beam projected by the signal but substantially all light incident upon the signal from an outside source will be absorbed. The inner cylindrical screen D preferably supports two flat ribs 9 disposed at right angles and intersecting in the axial line of the signal. The cover glass E not only holds the screens D in place but also prevents dirt from collecting on the screens and in the grooves of the outer lens $C^2$.

As shown in the drawing, the center portion of the inner surface of the cover glass E is provided with a plurality of horizontal prisms 12, so disposed as to bend the light rays from the center portion of the lens combination downwardly, in order to give an indication at a point close to the signal.

The screens D will prevent phantom indications caused by light rays from an outside source entering at an angle to the axis of the lenses, but the ordinary lamp which is used in such signals has its filament located at the geometrical center of curvature of the lamp bulb so that incident rays striking the lens in a direction parallel to the axis of the signal may be reflected from the lamp bulb and may be projected parallel to the axis of the lens to produce a phantom indication. In order to avoid this condition we make use of a lamp in which the filament 1 is eccentric with respect to the geometrical center of curvature of the bulb so that incident rays entering the signal in a direction which is parallel to the axis of the lens will be reflected at an angle to the axis, and will therefore be absorbed by the screens D. For example, a ray indicated by the dashed line R, entering the lens system parallel to the axis, strikes the bulb of lamp A at point K and also at point P. The major portion of the ray will be reflected downwardly from point K, striking one of the screens D at point $K^1$ where it will be absorbed. The portion of the ray striking the point P will be reflected upwardly striking one of the screens at point $P^1$ where it also will be absorbed. None of the light will be projected parallel to the axis of the lens combination because none of the rays can be projected through the focal point of the lens and hence it will be impossible, with this arrangement, for rays from an outside source entering the signal parallel to the axis to produce a phantom indication.

Referring now to Figs. 3 and 4, the signal shown in these views is similar to that shown in Figs. 1 and 2, except as follows:

In Fig. 3, the outer lens $C^2$ has its wedge-shaped grooves 3 on the inner surface, instead of on the outer surface as in Fig. 1. In other respects, the optical apparatus comprising the lamp A and the echelon lenses $C^1$ and $C^2$ is the same as the corresponding optical apparatus shown in Fig. 1.

In Fig. 3 the outer lens $C^2$ is held in place by a ring 14 which is attached to the frame B by a plurality of screws 17, and the cover glass, which is here designated $E^1$, is supported in a ring 15 of L-shaped cross-section, the cover glass being held in place against this ring by an outer ring 16 which is attached to the ring 15 by a plurality of screws 18. Between the two rings 14 and 15 is a channel-shaped ring K, which supports a screen structure $D^1$. The rings 15 and 16 and the ring K are all held in place by screws 19, which pass through rings 14, 15 and 16, into threaded holes in the frame B.

The screen structure $D^1$ comprises a spirally-wound flat strip 20 of thin metal, such as brass, and a spirally-wound corrugated strip of metal 21, a layer of the strip 21 being interposed between each two layers of the strip 20; the result of this is a honeycomb-like or cellular screen structure, all of the cells of which are parallel to the rays of light emerging from the outer lens $C^2$.

As best shown in Fig. 5, the center of the screen structure $D^1$ is left open; this opening is filled by an auxiliary screen structure H, and by an auxiliary lens G having horizontal prisms 12 on its inner surface so disposed as to bend the light rays from the center portion of the lens combinations $C^1$ and $C^2$ downwardly in order to give an indication at a point close to the signal. The auxiliary screen structure H is similar to the screen structure $D^1$, in that it comprises a spirally-wound flat metal strip $20^a$ and a spirally-wound corrugated metal strip $21^a$. The depth of the auxiliary screen structure H is less than the depth of the screen structure $D^1$, however, thereby leaving space for the auxiliary lens G and permitting the outer surface of this lens to be substantially flush with the outer surface of the screen structure $D^1$.

The lens G is supported in a ring 22, and is held in place in this ring by cutting the outer edge of the ring to provide clips $22^a$, which are bent inwardly against the outer surface of the lens. The lens G is kept from turning in the ring 22 by providing grooves $23^a$ in the periphery of the lens and pressing the ring 22 into these grooves, as indicated at 23. The ring 22 and the auxiliary screen structure H are both held in place in the main screen structure $D^1$ by soldering.

The screen structure $D^1$ is held in place in the channel-shaped ring K by a plurality of clips 24 (see Figs. 4 and 8) which fit into suitable grooves in the inner surface of the ring K and are riveted in place in such grooves. The outer ends of these clips are then bent over in front of the screen structure $D^1$.

It is, of course, essential that the prisms 12 on the auxiliary lens G shall be horizontal. After the parts of the signal are assembled, the angular position of the lens G may be adjusted by backing off the screws 19 turning the channel-shaped ring K until the prisms 12 are horizontal, and again tightening the screws 19 to lock the ring K in the adjusted position.

Although we have herein shown and described only two forms of light signals embodying our invention, it is understood that various changes and modifications may be made therein within the scope of the appended claim without departing from the spirit and scope of our invention.

Having thus described our invention, what we claim is:

A light signal comprising a frame, a doublet made up of two echelon lenses supported in said frame, an inner ring attached to said frame for holding the outer lens of said doublet in place in the frame, an L-shaped ring and an outer ring held together by screws, a cover glass mounted in said latter two rings, a channel-shaped ring located between said inner ring and said L-shaped ring, a screen structure supported in said channel-shaped ring for preventing phantom indications, and screws passing through said inner and outer rings and said L-shaped ring for holding all of the above-enumerated elements in place with respect to said frame.

In testimony whereof we affix our signatures.

ARTHUR W. FISHER.
WESLEY B. WELLS.